United States Patent [19]

Tsujita

[11] Patent Number: 5,012,462

[45] Date of Patent: Apr. 30, 1991

[54] DISC PLAYER HAVING LOCKING MECHANISM FOR PICKUP

[75] Inventor: Hirayuki Tsujita, Gifu, Japan

[73] Assignee: Sanyo Electric Co., Ltd., Moriguchi, Japan

[21] Appl. No.: 214,344

[22] Filed: Jul. 1, 1988

[30] Foreign Application Priority Data

Jul. 3, 1987 [JP] Japan ............................ 62-102852[U]

[51] Int. Cl.5 ...................... G11B 33/02; G11B 17/022
[52] U.S. Cl. ................................... 369/77.1; 369/77.2; 369/75.2; 369/36; 369/37; 366/38
[58] Field of Search ..................... 369/77.1, 77.2, 75.2, 369/36, 37, 38

[56] References Cited

U.S. PATENT DOCUMENTS

| | | | |
|---|---|---|---|
| 4,545,045 | 10/1985 | Baer et al. | 369/77.2 |
| 4,602,361 | 7/1986 | Kunaki et al. | 369/77.2 |
| 4,607,361 | 8/1986 | Schnitmaker et al. | 369/77.1 |
| 4,679,182 | 7/1987 | Kamoshita et al. | 369/77.2 |
| 4,730,296 | 3/1988 | Urata et al. | 369/75.2 |
| 4,773,058 | 9/1988 | Petruchik et al. | 369/77.2 |
| 4,796,244 | 1/1989 | Tsuruta et al. | 369/38 |
| 4,839,881 | 6/1989 | Takahara et al. | 369/77.1 |
| 4,899,328 | 2/1990 | Ishii et al. | 369/77.2 |
| 4,914,647 | 4/1990 | Ono et al. | 369/77.2 |

FOREIGN PATENT DOCUMENTS 62-51566 3/1987 Japan .

*Primary Examiner*—Stuart S. Levy
*Assistant Examiner*—Kenton R. Mullins
*Attorney, Agent, or Firm*—Armstrong, Nikaido, Marmelstein, Kubovcik, & Murray

[57] ABSTRACT

An improved disc player which is capable of preventing unnecessary movement of a pickup through simple construction so as to protect the pickup against any damage.

6 Claims, 2 Drawing Sheets

DISC PLAYER HAVING LOCKING MECHANISM FOR PICKUP

BACKGROUND OF THE INVENTION

The present invention relates to a disc player for reproducing a disc such as a CD, CD-ROM, etc., or for recording information on a DRAW disc (referred to merely as a disc player hereinafter).

In some disc players, a pickup for reproducing or recording information with respect to a disc is arranged to be displaced in a radial direction of the disc, for example, by a linear motor. In the above arrangement, if an urging force is applied to the pickup following displacement or the like of the disc player, the pickup is easily displaced so as to be subjected to impact forces, thus resulting in damages to precision optical components provided therein.

Therefore, in order to prevent unnecessary displacement of the pickup by fixing said pickup except for a period when a power source is turned on, there has conventionally been proposed, e.g. in Japanese Laid-Open Utility Model Publication No. 62-51566, a disc reproducing apparatus which is so arranged that, with a first rack disposed at one side of a pickup, a second rack urged to be engaged with said first rack in a stroke of displacement of said pickup is provided, and function of an operating member of a power source for actuating a power switch is adapted to be transmitted to said second rack through a mechanical transmission mechanism, so that, by the operation for turning on the power switch, the engagement between said second rack and first rack is released, while through operation for turning off the power source, said second rack is engaged with said first rack.

In the above conventional arrangement, however a complicated mechanical transmission mechanism is required for transmitting the function of the operating member for actuating the power switch to the second rack, thus resulting in a cost increase and undesirable complication of the arrangement on the whole.

SUMMARY OF THE INVENTION

Accordingly, an essential object of the present invention is to provide an improved disc player which is capable of preventing unnecessary movement of a pickup through simple construction, thereby to protect the pickup against any damage.

Another object of the present invention is to provide a disc player of the above described type, which is stable in functioning at high reliability, and can be readily manufactured at low cost.

In accomplishing these and other objects, according to one preferred embodiment of the present invention, there is provided a disc player which includes a pickup arranged to be displaced in a radial direction of a disc by a driving means, an engaging portion formed on the pickup, a holder which holds the disc and is displaced following a loading function, and a stopper portion formed on the holder, whereby during unloading, the stopper portion of the holder engages the engaging portion of the pickup to prevent the pickup from displacement, while the stopper portion and the engaging portion are separated from each other through displacement of the holder following the loading function so as to allow displacement of the pickup.

By the above arrangement of the present invention, the engaging portion is provided on the pickup, while the stopper portion is provided on the holder to be displaced following the loading function of the disc, and said engaging portion is arranged to be selectively engaged with or disengaged from the stopper portion so as to prevent or allow displacement of the pickup.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
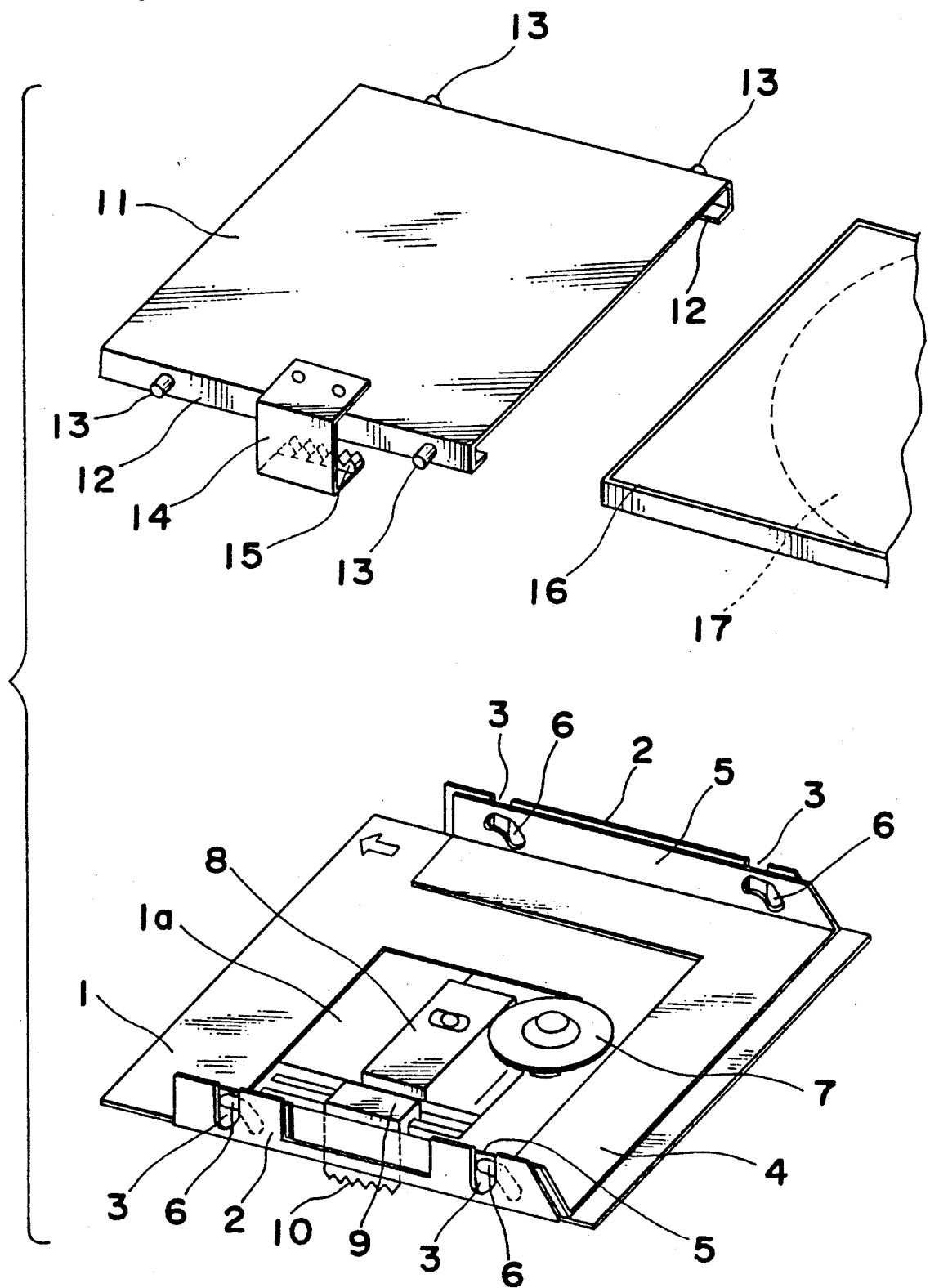
FIG. 1 is a perspective exploded view of a disc player according to one preferred embodiment of the present invention.

Before the description of the present invention proceeds, it is to be noted that like parts are designated by like reference numerals throughout the accompanying drawings.

Referring now to the drawings, there is shown in FIG. 1, general construction of a disc player according to one preferred embodiment of the present invention which includes a stationary or fixed chassis 1 having a rectangular opening 1a formed approximately at its central portion, a slider 4 disposed at the inner side of the chassis 1 so as to be slidably moved in a horizontal direction by a driving system (not shown), a turntable 7 provided in a position facing the opening 1a of the chassis 1 to be driven for rotation by a motor (not shown), a pickup 8 disposed also to confront the opening 1a for displacement in a horizontal direction by a linear motor 9 and having a first rack 10 formed at it lower edge, and a holder 11 disposed over the chassis 1 for receiving a cartridge 16 in which a disc 17 is rotatably accommodated.

The stationary chassis 1 is further provided with first folded portions 2 formed by folding a pair of opposed parallel edges of said chassis 1 upwardly, with each of the folded portions 2 being formed with a couple of elongated openings or notches 3 vertically extended At the inner side of the folded portions 2, a pair of opposed parallel edges of said slider 4 are folded upwardly to form second folded portions 5, while each of said folded portions 5 has a couple of guide holes 6 each including a horizontal portion and an inclining portion, and formed in positions confronting the elongated notches 3 of the first holded portions 2. The holder 11 also includes folded holding portions 12 formed by folding a pair of opposed parallel edges thereof into L-shape, rollers or projections 13 adapted to extend outwardly from the vertical portion of each folded holding portion 12, a stopper portion 14 having a U-shaped cross section and disposed at one edge of the holder 11, and a second rack 15 formed to extend upwardly from the lower edge of said stopper portion 14.

Thus, the holder 11 is disposed over the chassis 1 in a state where the rollers 13 thereof are received by the elongated notches 3 of the chassis 1 through the guide holes 6 of the slider 4.

Figure 2A:
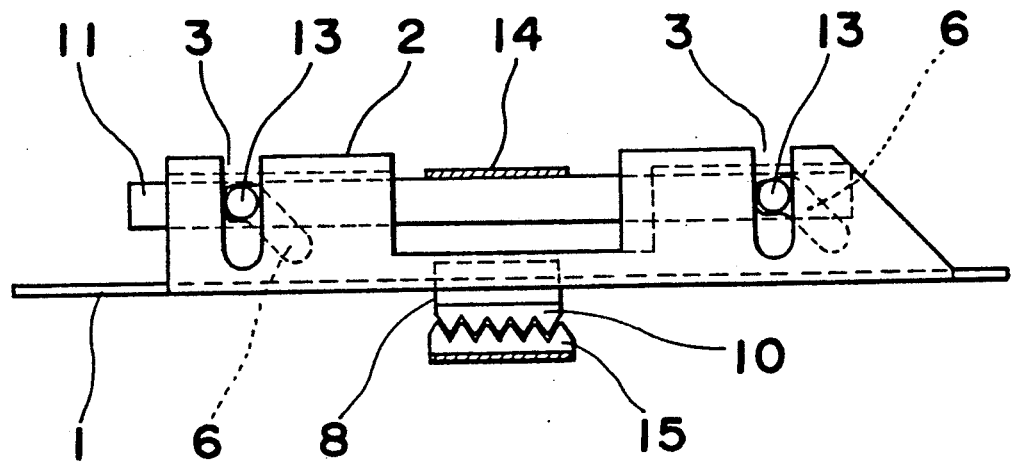
FIG. 2(a) is across sectional view of the disc player of FIG. 1 as assembled and showing one state of operation.

By the above arrangement, during unloading as shown in FIG. 2(a), the rollers 13 of the holder 11 are located at the horizontal portions of the guide holes 6 of the slider 4, and thus, the holder 11 is disposed at the high position. Therefore, the second rack 15 of the stopper portion 14 provided on the holder 11 is engaged with the first rack 10 of the pickup 8 located at a stand-by position, with the pickup 8 thus being prevented from the horizontal displacement.

Figure 2B:
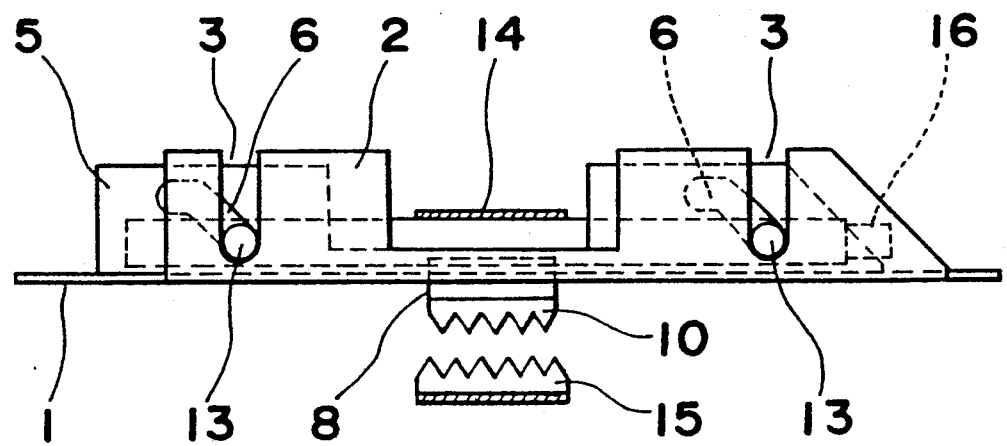
FIG. 2(b) is a view similar to FIG. 2(a), which particularly shows another state of operation.

Subsequently, when the loading is started, with the cartridge 16 being inserted into the holder 11, the slider 4 is displaced in a leftward direction as shown in FIG. 2(b), whereby the holder 11 is lowered, since the rollers 13 thereby are guided by the guide holes 6 of the slider 4 and the elongated notches 3 of the chassis 1. Accordingly, the second rack 15 of the stopper portion 14 provided on the holder 11 is disengaged from the first rack 10 of the pickup 8, and thus, the pickup 8 is brought into a state freely movable in the horizontal directions.

It is to be noted here that, although not particularly shown, the cartridge 16 includes, as is well known, an opening for exposing a central opening and an information recording and reproducing surface of the disc 17 and a shutter member for selectively opening or closing such opening depending on necessity, and by the above loading function, the disc 17 is placed on the turntable 7. Thus, the pickup 8 confronts the information recording and reproducing surface of the disc 17 so as to record or reproduce the information while moving in the radial direction of the disc 17.

As is clear from the foregoing description, according to the present invention, since the stopper portion for stopping the pickup during the unloading is provided on the holder holding the disc and displaced following the loading function, the undesirable displacement of the pickup is advantageously prevented through simple construction so as to protect the pickup against damages.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A disc player which comprises a pickup for displacement in a radial direction of a disc by a driving means, an engaging portion formed on said pickup, a holder for holding said disc and which is displaced vertically immediately following loading and unloading of a disc in said disc player, and a stopper portion formed on said holder, whereby during unloading, said stopper portion of said holder engages said engaging portion of said pickup to prevent said pickup from displacement, said stopper portion and said engaging portion being vertically separated from each other through said vertical displacement of said holder following loading for allowing displacement of said pickup.

2. A disc player as claimed in claim 1, wherein said engaging portion on said pickup is a first rack formed at a lower edge of said pickup.

3. A disc player as claimed in claim 1, wherein said stopper portion on said holder includes a second rack formed at the lower edge of said stopper portion and extending upwardly therefrom for the selective engagement with and disengagement from said engaging portion of said pickup.

4. A disc player comprising:
a fixed chassis;
a pickup provided on said fixed chassis for displacement in a radial direction of a disc by a driving means;
an engaging portion formed on said pickup;
a holder for holding said disc, said holder being displaced vertically immediately following loading and unloading of a disc in said disc player;
a stopper portion formed on said holder;
a slider provided between said fixed chassis and said holder, said holder being displaced in approximately a horizontal direction following loading and unloading;
a projection formed at a side face of said holder, a first guide means formed slant-wise in said slider to receive said projection therein, and a second guide means formed in said chassis extending approximately in a vertical direction to receive said projection therein;
whereby during unloading, said stopper portion of said holder engages said engaging portion of said pickup to prevent said pickup from displacement, and said holder is displaced along said second guide means by the displacement of said slider following loading to separate said stopper portion from said engaging portion for allowing displacement of said pickup.

5. A disc player as claimed in claim 4, wherein said engaging portion on said pickup is a first rack formed at a lower edge of said pickup.

6. A disc player as claimed in claim 4, wherein said stopper portion on said holder includes a second rack formed at a lower edge of said stopper portion and extending upwardly therefrom for selective engagement with and disengagement from said engaging portion of said pickup.

* * * * *